June 11, 1968

J. T. CRUSE 3,387,599

VACUUM INDICATING DEVICE

Filed Aug. 9, 1966

INVENTOR.
JOE TAYLOR CRUSE

BY
Donald W. Canady
ATTORNEY.

United States Patent Office 3,387,599
Patented June 11, 1968

3,387,599
VACUUM INDICATING DEVICE
Joe Taylor Cruse, Bellflower, Calif., assignor to Atlantic Richfield Company, Philadelphia, Pa., a corporation of Pennsylvania
Filed Aug. 9, 1966, Ser. No. 571,326
10 Claims. (Cl. 123—146.5)

ABSTRACT OF THE DISCLOSURE

A manifold vacuum sensing engine cutoff device having a reciprocable piston biased downwardly by gravity in a cylinder, the cylinder communicating with the engine manifold for supporting the piston in an upward position and having a vent opening the cylinder to atmosphere upon loss of vacuum, which includes contacts forming a switch which is closed upon loss of vacuum is exemplary of this disclosure.

---

This invention relates to a device for indicating when a vacuum is lost in a vessel and more particularly relates to an engine shutoff device for oil well drilling equipment.

One problem involved with the use of unattended pumping devices which are driven by internal combustion engines to withdraw oil from wells is that if the pump rod strings part, or for some reason the operation of the pump is in an unbalanced condition, the internal combustion engine continues running thereby further damaging working parts of the pump and the subsurface equipment. Thousands of dollars worth of damages to oil well pumping equipment are caused yearly due to the continued operation of these engines after the initial breakdown has been incurred.

An unbalanced condition caused by separation of the rod string or similar problems will appear as a decrease in vacuum in the intake manifold of the engine. Prior art devices have been designed to utilize the change in pressure at the intake manifold of the engine to detect a problem in operation of the pump and automatically shut down the engine.

One such device comprises a combination of a vacuum gauge and a motor kill switch. When the indicator from the vacuum gauge reaches a point on its scale which is predetermined by manual adjustment, it strikes a contact post connected to the magneto ground and shuts off the engine. Many times, however, due to motion of the pump counterweights, the engine is towed over the top of the stroke and a vacuum is gain built up moving the dial off the contacts. As a result, the magneto is no longer grounded and ignition is once again resumed causing the engine to pull the counterweights up over the next stroke to complete that part of its cycle and again build up the vacuum so that the dial is held off the contacts. These extra strokes may cause damage to the pump and subsurface equipment. It has been found that the engine can run for several hours by the towing of the counterweights and reignition, literally tearing itself up.

The moving parts of this device wear after a period of use so that the pointer cannot return to the setting to effect a shutdown. Thus the service life of the device is dependent upon the quality of material used for its moving parts and frequent examination is required to assure that it is in working condition.

Another type of device which has been employed is that disclosed in U.S. Patent No. 2,712,813 to W. V. Thomas issued July 12, 1955. This device comprises a chamber divided by a flexible diaphragm. One end of the diaphragm is connected to the intake manifold of an internal combustion engine so that the flexible diagram is in fluid communication with the intake manifold. The diaphragm is biased away from the intake manifold by means of a coil spring through which is passed a reciprocally mounted rod. At the end of the rod is a contact which is open when there is vacuum in the intake manifold. When an unbalanced condition is experienced, the vacuum drops and the coil spring pulls the rod and its contact against the force of the flexible diaphragm grounding the magneto of the engine and shutting it off.

Typically, in this type of device, after a period of use, the diaphragm hardens and either cracks so that it is totally inoperable or it deteriorates to such a degree that it is not flexibly responsive immediately to changes in the pressure in the intake manifold. Also, the diaphragm and preload spring are affected by temperature changes which alter the setting point to shut off the engine if an unbalanced condition occurs. This device also permits a carryover of the counterweight to rebuild vacuum in the intake manifold and reopen the circuit between ground and the magneto causing reignition of the motor which may damage the pumping equipment.

Accordingly, it is an object of the present invention to provide a simple, economical, and compact device for shutting off an internal combustion engine when an unbalanced condition is incurred and for preventing reignition due to towing of the engine.

Still another object of this invention is to provide a novel shutoff device which is responsive to a pressure change in the intake manifold of an internal combustion engine.

Another object of this invention is to provide an engine shutoff device having no moving parts during normal operation so that it is subjected to little mechanical wear and has a long lifetime of high efficiency.

It is another object of this invention to provide an engine shutoff device which is responsive to a pressure change in the intake manifold of the engine and which is nonresponsive to buildup of a vacuum in the intake manifold once the device has shutoff the negine until the device has been reset.

Yet another object of this invention is to provide an engine shutoff device for use on internal combustion engines on oil well pumping units wherein the device is responsive to an unbalanced condition in the pumping unit engine linkage and alternatively can be adjusted to tolerate such an unbalanced condition.

Other objects and novel features of this invention will become fully apparent from the appended claims and from the ensuing detailed description and discussion as it proceeds into conjunction with the accompanying drawings in which:

Figure 1:
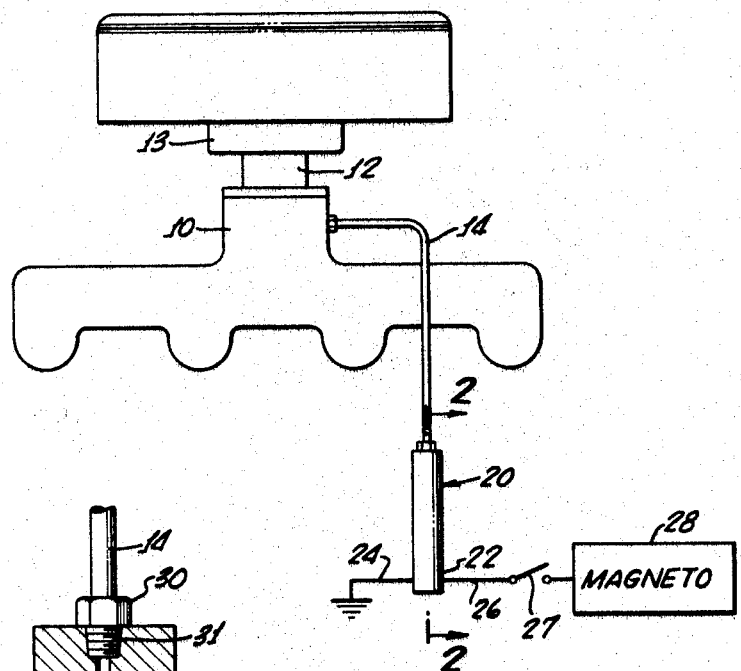
FIG. 1 is a diagrammatic view of the intake manifold of an internal combustion engine and the shutoff device of this invention.

Referring to FIG. 1, reference character 10 designates an intake manifold providing the usual inlet passageway for an air and gas mixture to the intake valves of an internal combustion engine (not shown). The manifold also communicates with the exit throat 12 of a carburetor 13. A suitable conduit 14 is connected to the intake manifold at a point between the connection to the carburetor and the intake valves as shown in FIG. 1. Conduit 14 is also connected to the upper end of the shutoff device 20 of this invention. Device 20 at its lower end 22 is provided with two electrical conductors 24 and 26. Conductor 24 is connected to ground and conductor 26 is connected to the magneto 28 of the internal combustion engine as will be discussed. A normally closed electrical switch 27 may be provided between shutoff device 20 and the primary side of magneto 28 for a reason to be discussed.

Figure 2:
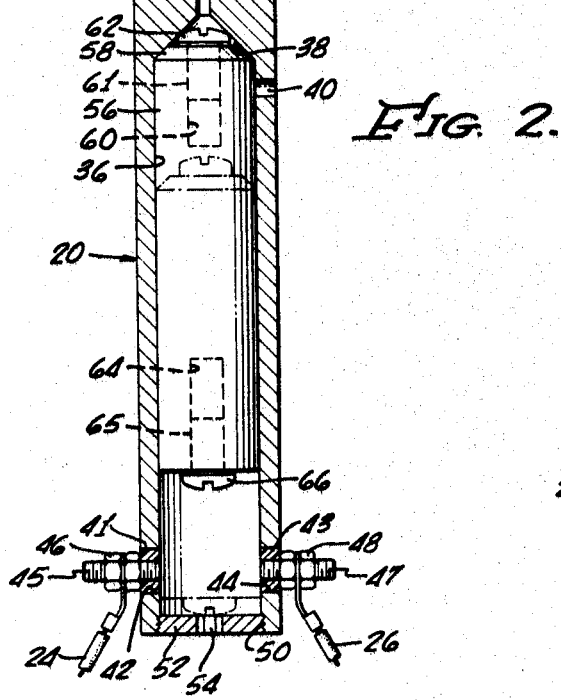
FIG. 2 is an enlarged partially sectioned view of the shutoff device taken substantially along lines 2—2 of FIG. 1.

As shown more clearly in FIG. 2, device 20 may be threadably connected to conduit 14 by means of any suitable connectors such as threaded adapter 30 which fits into an internally threaded bore 31 in device 20. Generally, device 20 comprises a cylindrical housing or tube 32 having an internal chamber formed by a small diameter upper bore 34 and a large diameter lower bore 36 joined to upper bore 34 by means of a conical seat surface 38. Bore 36 is provided near its upper end with a radially extending small diameter through-passage 40 which connects bore 36 with the atmosphere. At its lower end, bore 36 is provided with a pair of radially extending oppositely facing threaded through-apertures 42 and 44 provided with insulating sleeves 41 and 43 which are adapted to receive electrically conductive threaded stud terminals 45 and 47 carrying contact nuts 46 and 48 as shown in FIG. 2. Bore 36 is also provided with an internally threaded lower end portion 50 for receiving a flush threaded screw plug 52. Plug 52 is provided with through-opening 54 which may be adapted to receive an Allen wrench for securely tightening the plug in place. Tube 32 may be constructed from any strong material such as brass, or low carbon steel. Alternatively, cylindrical tube 32 may be constructed from an insulating material such as polyethylene or polyester resins and sleeves 41 and 43 may be eliminated.

The diameter of bore 36 is dimensioned to receive slidingly a cylindrical, electrically conductive plunger 56 having a conically shaped upper end surface 58 forming a truncated cone and having at its apex an axially extending bore 60 threaded at portion 61 for receiving a machine screw 62. Plunger 56 is also provided at its lower end with an axially extending bore 64 threaded at portion 65 for receiving a second machine screw 66. Plunger 56 is capable of axially sliding within bore 36 between an upper limit position defined by the seating of upper surface 58 in conical seat 38 of tube 32, as shown by the solid lines in FIG. 2, and a lower limit position, defined by engagement of screw 66 with screw plug 52, as shown by the dashed lines in FIG. 2. The plunger is maintained in its upper position by vacuum in the intake manifold and is biased toward its lower position by the force of gravity.

When a vacuum is present in intake manifold 10 and through-passage 40 is blocked, plunger 56 is pushed by the higher pressure air surrounding the device into its upper limit position. Through-passage 40 can be sufficiently blocked by the operator merely placing his finger over it. The outer surface of plunger 56 blocks through-passage 40 when the plunger is in its upper limit position. Seating surface 58 of plunger 56 is designed to form a tight seal with seat 38. Actually, seating may occur at the intersection of conical surface 38 and internal bore 36 so that no close tolerances are necessary on surfaces 38 and 58. A close tolerance and fine polish is beneficial on the surface of bore 36 and the outer surface of cylindrical plunger 56, however, so that plunger 56 will be securely maintained at its upper limit position by vacuum in the intake manifold.

When the internal combustion engine is running under a balanced condition, the vacuum from the intake valves maintains upper surface 58 of plunger 56 in seat 38. The surface of plunger 56 is in blocking relationship with through-passage 40 in lower bore 36. If an unbalanced condition is experienced by the engine due to the breaking of the rod string, or a similar problem, the vacuum in the intake manifold will decrease and plunger 56, due to the force of gravity, will fall away from seat 38 into its lower limit position in contact with the screw plug 52. In this position the surface of electrically conductive plunger 56 strikes contact stud terminals 46 and 48 thereby grounding out the magneto and shutting off the engine.

As plunger 56 falls by the force of gravity into contact with screw plug 52, through-passage 40 from central bore 36 to the atmosphere is opened. This prevents the buildup of vacuum in the chamber defined by upper bore 34 and lower bore 36 once plunger 56 has fallen away due to a change in the pressure in the intake manifold of the engine. Even if the counterbalance weights of a pumping unit should carry the engine another stroke, a vacuum cannot build up in device 20 to move plunger 56 out of engagement with terminals 46 and 48 and therefore reignition of the motor cannot occur. Plunger 56 may be reset by opening switch 27 which allows the engine to be started and closing through-passage 40 thereby allowing plunger 56 to be drawn, by vacuum in the intake manifold, into contact with seat 38.

Plunger 56 may be made from brass, stainless steel, low carbon steel or other suitably strong and electrically conductive material. Bores 60 and 64 may be partially filled with a heavy material such as mercury for precisely weighting plunger 56 so that it will drop away from seat 38 at a pressure buildup in the intake manifold of any preselected value. Normally these bores do not have to be filled when a brass plunger is used. By selecting the proper weight material for plunger 56 and by dimensioning bores 60 and 64, the degree of vacuum loss at which the plunger will drop can be closely regulated.

Satisfactory results can be obtained by varying the apex angle of surfaces 38 and 58 between 45° and 180°, i.e. a flat rather than conical surface may be used. Best results have been obtained by using an apex angle of 90°. It is contemplated that any complementary seating surface design could be used for these surfaces.

Figure 3:
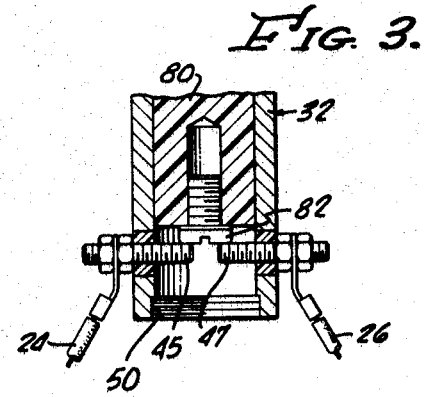
FIG. 3 is an enlarged sectional view of the lower portion of the shutoff device of FIG. 2 as adjusted to receive another embodiment of the plunger of the device of this invention.

As shown in FIG. 3, a nonconductive plunger 80 may be used in the place of conductive plunger 56 and an electrically conductive flat headed stud pin 82 may be threadedly or otherwise inserted into the lower central bore of the plunger. In this embodiment, stud terminals 45 and 47 are radially disposed to contact conductive pin 82 and define the lower limit position for axial movement of plunger 80. Screw plug 52 may be eliminated since plug 80 is prevented from falling from tube 32 by terminals 45 and 47. Plunger 80 of this embodiment may be constructed from polyethylene, molded polyester resins and similar high strength nonconductive materials.

Generally, any materials which are not mutually corrosive and which do not seize or adhere to one another when in contiguous relationship for long periods of time may be used for the cylindrical housing and plunger of the device of this invention. For example, the plunger may be a plastic and the housing a metal and vice versa or both may be made from a metal such as a stainless steel or cartridge brass.

The device of this invention as described provides positive shutdown without the possibility of rebuildup of a vacuum and reignition of the engine due to carryover of counterweights in the pumping unit. Also this device will tolerate an unbalanced condition of a well which is being pumped up since the device only shuts off the engine when a pressure increase occurs in the intake manifold and not when a high vacuum is being drawn. Since plunger 56 is the only moving component, and it only moves at the time of an unbalanced condition and when reset, problems due to wear in the operation of the device are minimized.

While the device is particularly applicable for use on oil well pumping units driven by internal combustion engines, it has additional applicability for use in indicating the loss of a vacuum in any vacuum vessel. For example, the device may be fluidly connected to any vacuum chamber and contacts 24 and 26 may be electrically connected to a lamp or other signaling apparatus for indicating when the pressure has increased in the chamber.

Obviously, many modifications and variations of the invention, as hereinbefore set forth, may be made without departing from the spirit and scope thereof and therefore only such limitations should be imposed as are indicated in the appended claims.

I claim:
1. A device for indicating an increase in the pressure of a normally low pressure vessel comprising:
  means defining a passageway for providing fluid communication between said device and said vessel;
  means in said device defining first and second limit positions;
  means in said device for sensing a low pressure in said vessel and for moving between said first and second limit positions, said sensing means being retained at said first limit position in response to a low pressure in said vessel and said sensing means being moved by gravity to said second limit position in response to a predetermined increase in pressure in said vessel;
  means located adjacent said second limit position for contacting said sensing means when it is in said second limit position and for indicating that said device has sensed a pressure increase in said vessel; and
  means for communicating an increased pressure to the device when said sensing means moves from said first limit position.

2. The device defined in claim 1 wherein said vessel is the intake manifold of an internal combustion engine provided with a magneto, said contacting means comprise electrical contacts connected to ground and to the primary side of said magneto of said internal combustion engine and said sensing means is electrically conductive so that when said sensing means moves into said second limit position said magneto is grounded and said engine is shut off.

3. An internal combustion engine shutoff device comprising:
  means defining a housing;
  means fluidly connecting said housing to the intake manifold of an internal combustion engine;
  means within said housing defining first and second limit positions and a passageway therebetween;
  means movable within said housing between said first and second limit positions in response to pressure changes within said intake manifold;
  cooperating seat means at said first limit position and on said movable means for maintaining said movable means in said first limit position in response to a predetermined low pressure in said intake manifold;
  means at said second limit position for shutting off said engine when said movable means is moved into said second limit position in response to a predetermined pressure increase in said intake manifold; and
  means defining a through-passage adjacent said first limit position for connecting said passageway with the atmosphere, said through-passage being closed when said movable means is in said first limit position and being opened when said movable means is in said second limit position.

4. An internal combustion engine shutoff device as defined in claim 3 wherein said movable means comprises a plunger disposed in said passageway and axially movable therein, said plunger being maintained in said first limit position by the presence of a vacuum in said intake manifold and being biased toward said second limit position by the force of gravity.

5. An internal combustion engine shutoff device for use on oil well pumping units having counterbalanced drive connections and internal combustion engines with magnetos comprising:
  means defining a chamber;
  means for fluidly connecting said chamber with the intake manifold of an internal combustion engine;
  means within said chamber for sensing the presence of a vacuum in said intake manifold;
  means responsive to said sensing means for shutting off said engine when a vacuum is not sensed in said intake manifold; and
  means for venting said chamber for rendering said sensing means temporarily inoperable after said engine has been shut off.

6. An internal combustion engine shutoff device as defined in claim 5 wherein said chamber is cylindrical, said sensing means comprises a cylindrical plunger slidably mounted within said chamber and having a seat surface at its upper end, and said chamber includes a complementary seat at its upper end for receiving said plunger seat.

7. An internal combustion engine shutoff device as defined in claim 6 wherein said vent means for rendering said sensing means temporarily inoperable comprises a radially extending through-passage connecting said chamber with the atmosphere and being closed when said plunger is seated in the upper end of said chamber and being opened when said plunger falls away from said seat due to a pressure change in the intake manifold of said engine.

8. An internal combustion engine shutoff device as defined in claim 5 wherein said sensing means includes an electrically conductive portion and said means responsive to said sensing means comprises a pair of electrical contacts at the lower end of said chamber, one of said contacts being connected to ground and the other of said contacts being connected to the primary side of the magneto of said internal combustion engine, said sensing means being so disposed within said chamber that said electrically conductive portion completes a circuit between said contacts when a vacuum is not sensed in said intake manifold.

9. An internal combustion engine shutoff device as defined in claim 5 wherein said means defining a chamber includes a cylindrical member having an upper bore of small diameter and a lower bore of larger diameter, said upper and lower bores being connected by a conical seat; said means fluidly connecting said chamber with the intake manifold of an internal combustion engine comprises a tubing connected to said upper bore and said intake manifold; said sensing means comprises a plunger having a complementary seat surface on its upper end and being cylindrical to fit within said chamber and having an electrically conductive portion, said plunger seating in said conical seat when a vacuum is present in said intake manifold and falling away from said seat when a vacuum is not present in said intake manifold; said responsive means comprises a pair of electrical contacts at the lower end portion of said chamber, one of said contacts being connected to ground and the other of said contacts being connected to the primary side of the magneto of said engine; and said means for rendering said sensing means temporarily inoperable comprises a radially extending through-passage in the lower bore of said chamber adjacent said conical seat, said through-passage being closed when said plunger is seated in said conical seat and being opened when said plunger falls away therefrom so that carryover of said engine due to said counterbalanced drive connections will not cause a vacuum buildup in said chamber to pull said plunger back into contact with said seat once said plunger has fallen away.

10. A device as defined by claim 9 wherein said plunger is axially bored to receive a high density material for adjusting the degree of vacuum loss at which fall away will occur.

References Cited

UNITED STATES PATENTS

| | | | |
|---|---|---|---|
| 1,664,065 | 3/1928 | Dowdy et al. | 200—82 |
| 2,131,264 | 9/1938 | Benjamin | 123—198 |
| 2,712,813 | 7/1955 | Thomas | 123—198 XR |
| 3,259,712 | 7/1966 | Libby | 200—82 |

FOREIGN PATENTS 1,139,627  2/1957  France.

WENDELL E. BURNS, *Primary Examiner.*